United States Patent [19]

Tanaka

[11] Patent Number: 4,732,489
[45] Date of Patent: Mar. 22, 1988

[54] CIRCULATING TYPE BALL SPLINE BEARING

[75] Inventor: Kazuhiko Tanaka, Yokohama, Japan

[73] Assignee: Nippon Thompson Co., Ltd., Tokyo, Japan

[21] Appl. No.: 892,999

[22] Filed: Aug. 4, 1986

[30] Foreign Application Priority Data

Apr. 5, 1986 [JP] Japan ................................. 61-78743

[51] Int. Cl.$^4$ ............................................. F16C 29/06
[52] U.S. Cl. ....................................................... 384/45
[58] Field of Search ............................ 384/45, 43, 44; 464/168

[56] References Cited

U.S. PATENT DOCUMENTS

| 4,363,526 | 12/1982 | Teramachi | 464/168 |
| 4,375,305 | 3/1983 | Teramachi | 384/45 |
| 4,572,591 | 2/1986 | Walter et al. | 384/45 |

Primary Examiner—Lenard A. Footland
Attorney, Agent, or Firm—Trexler, Bushnell, Giangiorgi & Blackstone, Ltd.

[57] ABSTRACT

A circulating type ball spline bearing may comprise a cylindrical outer sleeve having an internal annular bore, a cylindrical spline shaft adapted to be inserted into said internal annular bore of the outer sleeve and a plurality of balls to be intervened between said two members and operating in parallelly extending matching grooves so as to allow rectilinear relative motion between the two members. To manufacture the above-mentioned bearing with a compact size yet an appreciable rigidity, a plurality of arc-shaped ball turn channels for turning the direction of circulating balls between the load carrying ball grooves and non-load carrying ball return bores are provided in the end lids that are secured onto the opposite end faces of said cylindrical outer sleeve, while in the outer sleeve, each of the ball return bores is so positioned as seen in the cross section to be closer toward the spline shaft side than the plane including the centers of two adjacent balls present in two adjacent parallel load carrying ball grooves of the outer sleeve.

5 Claims, 8 Drawing Figures

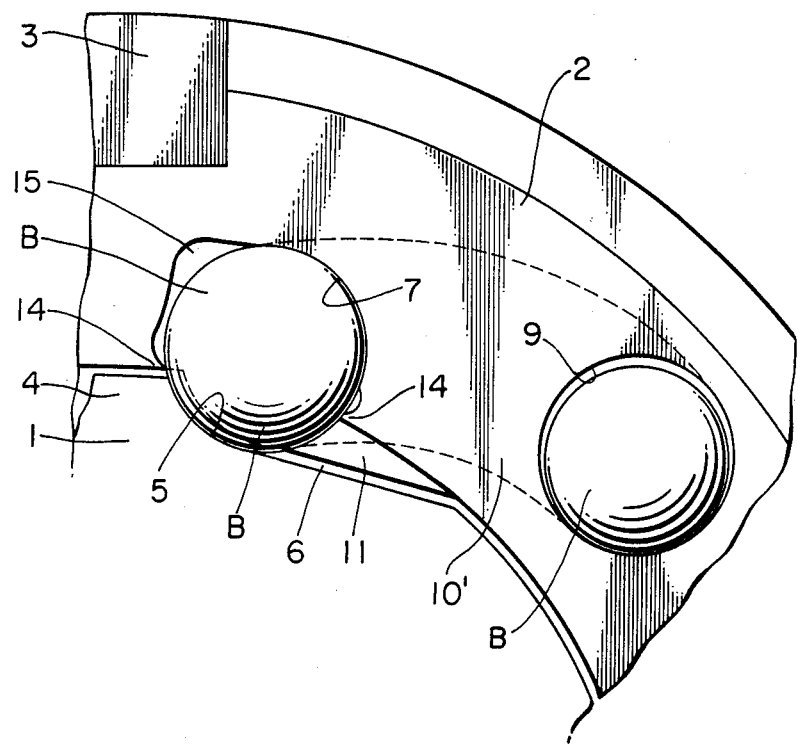
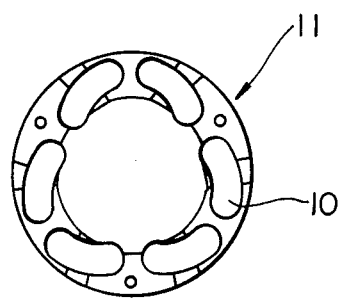

CIRCULATING TYPE BALL SPLINE BEARING

BACKGROUND OF THE INVENTION

1. Field of the Invention

The present invention relates to a circulating type ball spline bearing comprising a cylindrical outer sleeve having, on its internal surface, a plurality of axially extending raceway grooves, a spline shaft adapted to be movably received within said cylindrical outer sleeve and having, on its outer periphery, a plurality of axially extending raceway grooves in facing relation with said respective axially extending raceway grooves of the cylindrical outer sleeve, and a plurality of balls intervening between the facing pairs of the axially extending raceway grooves of said cylindrical outer sleeve and spline shaft, respectively, wherein by endlessly circulating said balls through said cylindrical outer sleeve, a rectilinear relative motion may be realized between said cylindrical outer sleeve and spline shaft with a torque being transferred therebetween.

2. Description of the Prior Art

Heretofore, various kinds of inventions have been made regarding circulating type ball spline bearings but they had not a few disadvantages regarding the size and rigidity so that a ball spline bearing having a small size yet a high rigidity was demanded in the art.

For example, U.S. Pat. No. 3,659,435 specification, published on May 2, 1977 disclosed a circulating type ball spline shaft having a cylindrical outer member or outer sleeve wherein each of the ball return bores is formed therewithin on the plane including the centers of two adjacent load carrying balls as seen in the cross section in the cylindrical outer member, so that the wall thickness of the cylindrical outer member was unavoidably become greater, thus resulting in a restriction of miniaturization thereof.

On the other hand, U.S. Pat. No. 4,375,305 specification, published on Mar. 1, 1983 essentially employed a ball retainer in a cylindrical outer member, while U-shaped channels are radially cut into the inner periphery of said cylindrical outer member to form non-load carrying ball grooves and load carrying ball grooves, respectively, in said cylindrical outer member, and these grooves may be formed respectively or simultaneously by a broaching or slotting operation, thereby enhancing the efficiency of the grooving operation to a considerable degree.

Moreover, according to the above-mentioned invention, each of ball turning grooves is arcuately bent toward the spline shaft side so that the size of the bearing can be much reduced than that of the prior art spline bearing but to avoid any accidental falling-off of the non-load carrying and load carrying balls from the U-shaped grooves, they must be retained in the cylindrical outer member with the aid of a retainer, thereby not only inevitably requiring much greater number of constructional parts for assembling the bearing but also giving rise to cumulative error in the assembling precision that will cause incidental falling-off of the balls from the race way grooves and further increasing sliding friction due to undesirable contact in operation between the retainer and the circulating balls.

SUMMARY OF THE INVENTION

The present invention is therefore aimed at eliminating the various disadvantages inherent in the prior bearings by providing a circulating type ball spline bearing having a high precision and rigidity yet requiring a low cost in the manufacture. More particularly, the present invention has an object of providing a circulating type ball spline bearing capable of disassembling the spline shaft, as desired, from the cylindrical outer sleeve with the balls being securely retained in the ball circulating grooves thereof.

The circulating type ball spline bearing according to the present invention therefore includes a generally cylindrical spline shaft, a cylindrical outer sleeve adapted to movably receive said cylindrical spline shaft therein, a plurality of balls to intervene between said cylindrical spline shaft and cylindrical outer sleeve, and end lips secured onto the opposite end faces of said cylindrical outer sleeve, each including ball turn channels for turning the direction of circulating balls.

To attain the aimed object mentioned above, the present invention with the above-mentioned construction is further characterized by:

(1) An arc-shaped ball turn channel for turning the direction of circulating balls is provided in each of the end lids that in turn are secured onto the opposite end faces of said cylindrical outer sleeve, (2) A ball return bore for circulating balls in the cylindrical outer sleeve is so positioned, as seen in the cross section, to be on the spline shaft from the extension line coneting the centers of two adjacent balls present in two adjacent load carrying ball grooves that are formed on the inner periphery of said cylindrical outer sleeve, and (3) Each of the load carrying ball grooves formed in the cylindrical outer sleeve has an - shaped cross section capable of containing more than half of the whole volume of one of the load carrying balls circulating therethrough, with the breadth of a slit opening on the inner periphery of the outer sleeve being slightly smaller than the diameter of the ball.

Due to the above-mentioned construction, the circulating type ball spline bearing according to the present invention can improve finishing accuracy of the respective constructional parts, while insuring a smooth circulating of bearing balls, and particularly can form the cylindrical outer sleeve in a compact structure having a reduced outer diameter, thus greatly improving the operation stability at high speeds.

BRIEF DESCRIPTION OF THE DRAWINGS

FIG. 4 is the detail of FIG. 2 showing the upper right-hand quarter thereof in an enlarged scale, FIG. 5 is a plan view of an end lid.

DESCRIPTION OF PREFERRED EMBODIMENT

Figure 1:
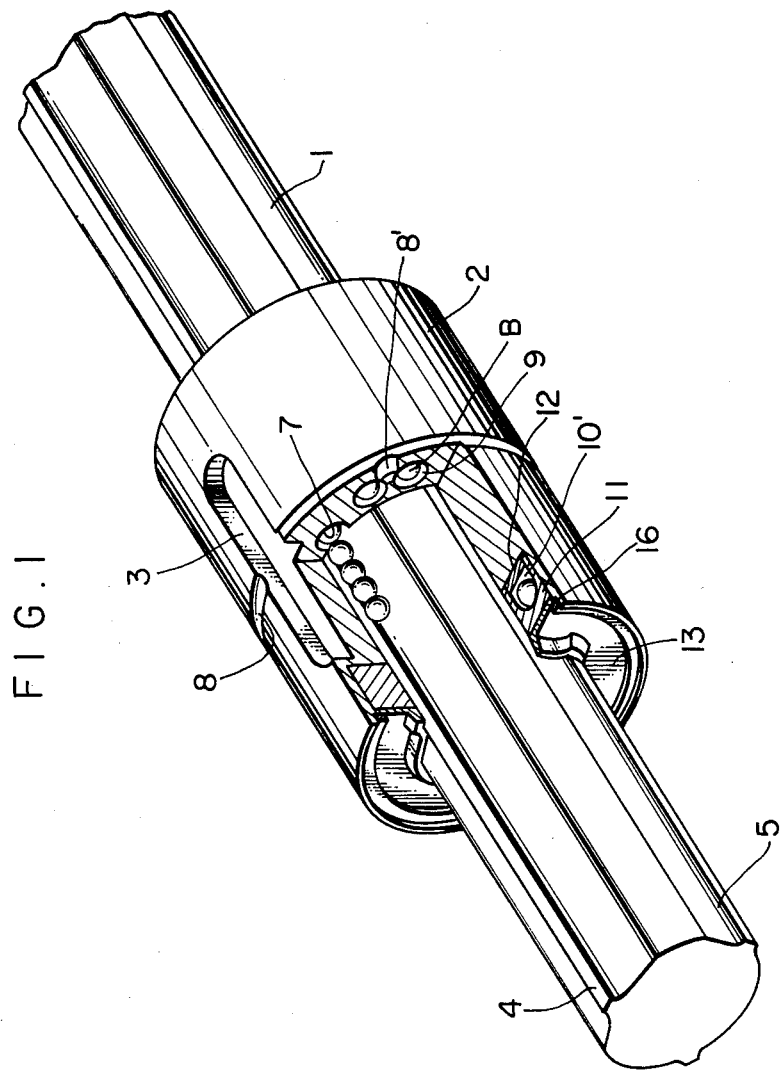
FIG. 1 shows a perspective view of one of the embodiments according to the present invention.

Referring now to FIG. 1, designated at 1 is a spline shaft having a generally cylindrical shape, on the outer periphery of which a plurality of axially extending ridges 4 each having trapezoidal cross section are formed at several places along its circumference, while forming two adjacent grooves 5 on the opposing sides of each of the ridges 4. Such ridges 4 are preferably provided on the outer periphery of the spline shaft in a plural number with a circumferential equis-paced relation.

The reference numeral 2 denotes a cylindrical outer sleeve capable of receiving the spline shaft 1 in a displaceably movable fashion within its internal cylindrical axial bore having a diameter slightly larger than the outer diameter of said spline shaft. On the inner peripheral surface of said internal annular bore of the outer sleeve are provided, for guiding and circulating load carrying balls, a plurality of inner peripheral grooves 7 in facing relation with a plurality of grooves 5 formed on the outer of the spline shaft 1, while two adjacent inner peripheral grooves 7 face the opposite sides of a ridge 4, respectively.

In the assembled state where the spline shaft 1 has been inserted into the internal annular bore of the cylindrical outer sleeve 2, a plurality of balls are intervened between the mating outer peripheral grooves 5 and inner peripheral grooves 7 which are in turn provided on the outer periphery of the spline shaft 1 and the inner periphery of the cylindrical outer sleeve 2, respectively, so as to form raceway grooves for load carrying balls therebetween.

It should be noted that the outer and inner grooves 5 and 7 each form, in the cross section, a circular arc substantially of the same curvature as the balls.

To the bearing parts of the thus assembled circulating type ball spline bearing can be fed lubricating oil from outside, as shown in FIG. 1, where the lubricating oil is simply fed through an oiling groove 8 extending around the center part of the cylindrical outer sleeve 2 into a group of balls present in the return bores 9 via oiling pores 8'.

Figure 6:
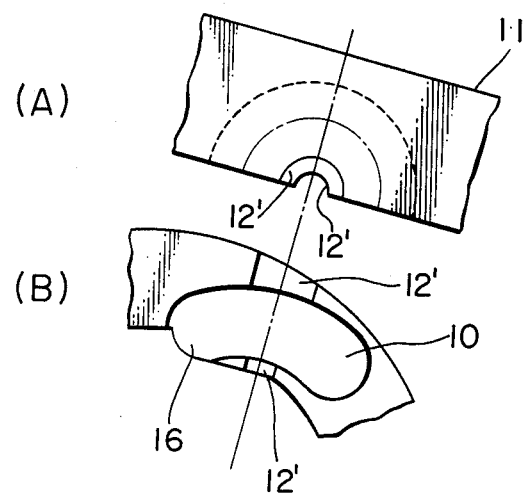
FIG. 6 is a view illustrating the ball turn channel formed in the end lid, wherein (A) is a side view and (B) is a cross section.

Referring to FIGS. 1, 5 and 6, respectively, an end lid 11 is provided at each end of the cylindrical outer sleeve 2, in which a plurality of ball-turn channels 10' are formed at predetermined locations such that each of the ball turn channels 10' is arcuately bent as seen not only on the plane extending parallel to the axis of the cylindrical outer sleeve but also on the plane extending perpendicular to said plane, while at one end of each of the ball turn channels 10' is formed a rake portion 16 for smoothly guiding the load carrying balls into the ball turn channels from the load carrying ball grooves.

The ball turn channel 10' is formed by combining a turning groove 10 with a spacer 12 that is mounted onto a spacer mounting groove 12' formed and extending on the inner surface of the end lid 11 across the center portion of the turning groove 10. The configuration of said spacer mounting groove 12' is such that the arcuately cross sectional opening of the groove 12' toward the outer periphery of the end lid has a greater radius than that opening toward the inner periphery of the end lid, so that the space available in the end lid 11 may be utilized as much as possible so as to enhance the fastening of the spacer 12 within the spacer mounting grooves 12'.

Figure 2:
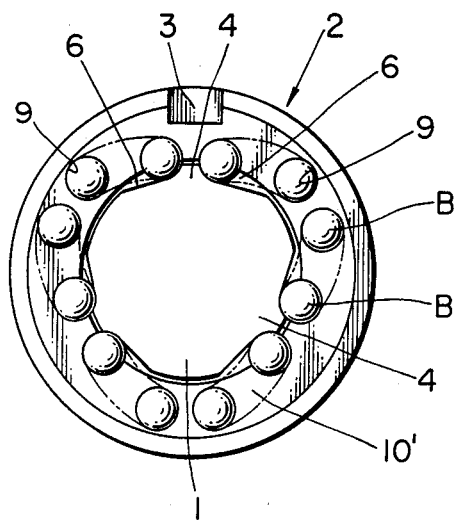
FIG. 2 is a cross section of the assembled bearing taken along the oiling groove of the outer member shown in FIG. 1.
Figure 3:
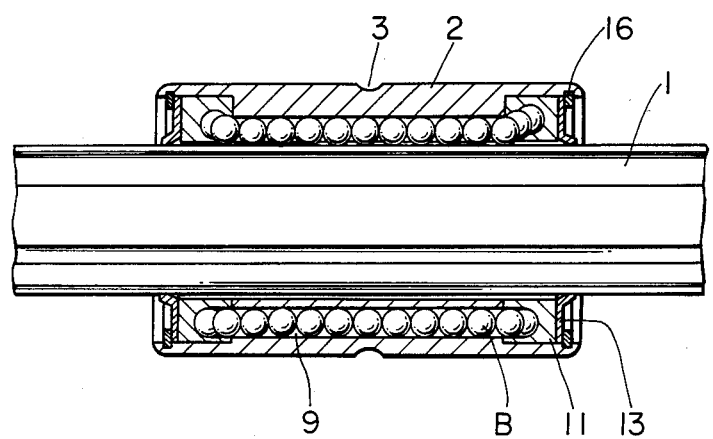
FIG. 3 is a longitudinal section of the assembled bearing according to the present invention.

The key way 3 provided on the outer surface of the cylindrical outer sleeve, as shown in FIGS. 1, 2 and 3, may take any abitrary shape to make it suitable for connecting with any machine elements and tools.

FIG. 2 shows a cross section of the cylindrical outer sleeve 2, taken along the oiling groove 8, wherein each of the respective ball return bores 9 is so positioned as seen in the cross section to be on the spline shaft side from the extension line connecting the centers of two adjacent balls present in two adjacent load carrying ball grooves 7 that are formed on the opposing sides of one of the axially extnding trapezoidal ridges formed on the outer surface of the spline shaft.

The ball turn channels 10' as indicated by imaginary lines on FIG. 2 are formed in an end lid 11 in such a manner that each of the ball turn channels is arcuately bent as seen not only on the plane extending parallel to the axis of the cylindrical outer sleeve but also on the plane extending perpendicular to said plane so as to realize a smooth circulation of the balls therethrough.

According to this particular construction of the present invention, the diamemter of spline shaft can be made greater, thus enabling to greatly enhance the rigidity thereof, since unlike the prior spline bearing, a retainer or the like is entirely unnecessary to retain the balls.

In FIG. 3 corresponding to the axial section of FIG. 1, a row of load carrying balls is shown in the upper side, which balls contact on and circulate along the load carrying inner peripheral groove 5 formed on both sidewalls of the axially extending trapezoidal ridge 4 of the spline shaft 1. In the lower side, there is shown a group of non-load carrying balls aligned in a ball return bore 9.

Onto the axially opposing ends of the cylindrical outer sleeve 2 are fixed the end lids 11 in which are provided a plurality of ball turning channels 10' capable of transferring the load carrying balls from the outlet ends of the inner peripheral grooves 7 of the cylindrical outer sleeve 2 to the respective return bores 9.

If desired, seal means 13 may be securely fitted onto the outer surface of the end lid 11 with the aid of any suitable fixture means.

FIG. 4 is an enlarged view of a part of FIG. 2, illustrating the details of the load carrying outer peripheral groove 5 formed on both sides of a ridge 4 axially extending on the outer periphery of the spline shaft 1 as well as the mating load carrying inner peripheral groove 7 formed on the inner periphery of the cylindrical outer sleeve 2.

The outer peripheral grooves 5 of the spline shaft 1 may be formed by milling, on the outer peripheral surface of a shaft having a circular cross section, a pair of parallel and axially extending circuit recesses 6 leaving an axially extending ridge 4 having a trapezoidal cross section therebetween, thereby forming a pair of track grooves 5 having a U-shaped cross section on the opposite side walls of the thus formed ridge 4, enabling to keep the greatest possible cross sectional area of the spline shaft so as to enhance the rigidity thereof.

In FIG. 4 is shown the positional relation between the ball retaining projection 14 and the relief portion 15 forming a guide track for load carrying balls which may be formed on the inner surface of the outer sleeve by a broaching operation so that a stable retention of load carrying balls in the guide track can be greatly improved due to its constructional accuracy.

The contact surface of the track groove with the ball may be heat-treated, followed by a special lapping operation to obtain the finish of a predetermined surface roughness and dimensional accuracy, while a relief portion 15 is provided in the guide track to enhance the lapping efficiency.

Figure 7:
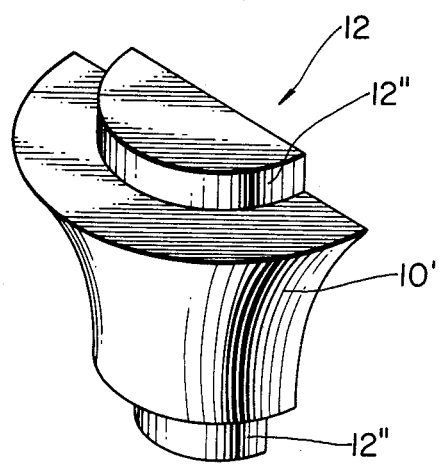
FIG. 7 is a perspective view of a spacer that is employed to form a turn bore for turning the circulating balls.

Referring to FIG. 7, a spacer 12 is shown, which is to be fitted into a ball turning groove 10 to form a ball turning channel 10' in the end lid 11. The spacer 12 consists of an upper projection 12" having a larger semi-circular cross section, a lower projection 12'" having a smaller semi-circular cross section, and a tapered middle portion having gradually varying semi-circular cross sections in the axial direction, so that the spacer 12 may be snugly fitted into the ball turning groove 10 with the outer peripheral surface of said tapered middle portion forming ball turning channel 10'. By so shaping the upper and lower portions of the spacer 12, an improved workability thereof is realized. The outer surface of the spacer 12 in contact with the cylindrical outer sleeve 2 is made flat so as to prevent it from relative rotation therewith.

Figure 8:
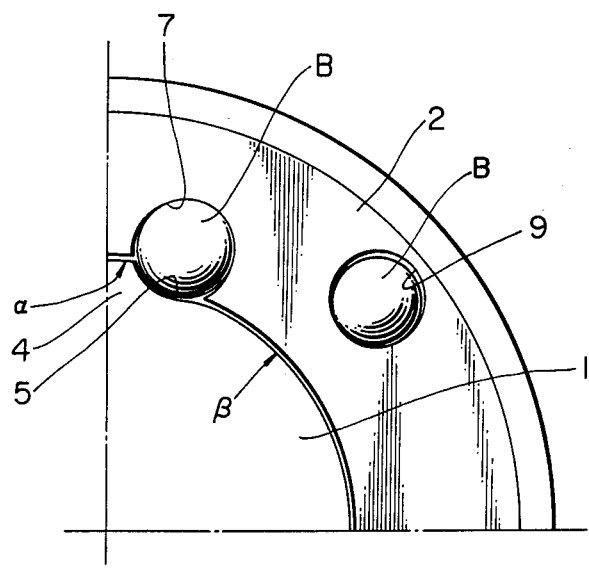
FIG. 8 is a view similar to FIG. 4 but showing part of the second embodiment of the present invention.

A second embodiment of the present invention is illustrated in FIG. 8, wherein the outer periphery of the spline shaft is formed, as seen in the cross section, from two kinds of arcs $\alpha$ and $\beta$ having different radii, in combination, the arc $\alpha$ having a greater radius to form the apex of a trapezoidal ridge 4 and the arc $\beta$ having a smaller radius forming the other part of the outer periphery of the outer sleeve excepting the ridge 4, with the outer peripheral grooves 5 being formed on both sides thereof. Namely, this second embodiment has a far more simple shape than that of the first embodiment so as to facilitate the shaping procedure thereof.

Similarly, the inner periphery of the cylindrical outer sleeve 2 excluding the inner peripheral groove 7 may be shaped with two kinds of arcs having different radii, thus also facilitating the shaping procedure thereof.

The load carrying inner peripheral groove 7 may be formed by firstly boring the thick side wall of the cylindrical outer sleeve 2 in its axial direction at a predetermined position with the use of a drilling tool and then cutting at the inner surface of the thus formed bore toward the inner peripheral surface of the cylindrical outer sleeve until the bore is partly exposed to the internal annular bore and made to form a groove open thereonto with an axially extending narrow slit.

On the other hand, the ball return bore 9 is simply bored at a position into the thick sidewall of the cylindrical outer sleeve in the axial direction.

Further, the said load carrying inner peripheral groove 7 is formed to have a slightly greater arc in the cross section than the arc forming the cross section of the ball for an easy working, so that a circulating type ball spline bearing can be provided at a low price.

It is to be understood that the present invention is not limited to the particular embodiments mentioned above but includes all the modifications and alterations so far as they fall in the scope claimed in the appended claims.

What is claimed is:

1. A circulating type ball bearing comprising a spline shaft having a generally cylindrical shape, on the outer periphery of which are formed a plurality of axially extending ridges 4 at several places along its circumference, each of said ridges retaining, as the crest surface, part of the circumference of the spline shaft and each of the opposing side surfaces thereof having a circular arc cross section portion to form a load carrying ball groove with a continuing and adjacent relieved surface portion, a cylindrical outer sleeve having an axial bore and capable of receiving said spline shaft in an axially displaceably movable fashion within its internal axial bore, the inner peripheral surface of said internal annular bore being provided with a plurality of load carrying ball grooves in facing relation with said load carrying ball grooves formed on the outer periphery of said spline shaft, and a plurality of balls of predetermined diameter intervening between the facing pairs of the axially extending load carrying ball grooves of said outer sleeve and of said spline shaft, respectively, wherein ball return bores are provided within the side wall of said cylindrical outer sleeve including ball return bores within the side wall thereof with each of the respective ball return bores being so positioned as seen in the cross section as to be on the spline shaft side from an extension line connecting the centers of two adjacent load carrying balls present in two adjacent load carrying ball grooves that are formed on the inner periphery of said cylindrical outer sleeve, a plurality of arcuateley bent ball turn channels for guiding the load carrying balls to said ball return bores being formed within an end lid that is provided at each of the opposite end faces of the cylindrical outer sleeve and each of the load carrying ball grooves of said cylindrical outer sleeve having a Greek letter omega shaped cross section with an axially extending slit opening narrower than said ball predetermined diameter on the inner surface of said cylinder outer sleeve thereby retaining therein a greater part of each whole volume of the load carrying ball.

2. The circulating type ball spline bearing as claimed in claim 1, wherein the ridges are milled on the outer periphery of the spline shaft having a circular cross section, a pair of parallel and axially extending cutout recesses leaving a narrow space therebetween and said relieved surface portion of the load carrying ball grooves each, excluding the portion having a circular arc cross section, having a straight line cross section extending generally in the direction tangential to the circumference of the related ball return bore.

3. The circulating ball spline bearing as claimed in claim 1, wherein the ridges on the outer periphery of the spline shaft are formed by constructing the cross section of said spline shaft with two kinds of arcuate cross sections having different radii in combination and the load carrying ball grooves of the cylindrical outer sleeve each are shaped to have an arcuately cross section having a radius slightly larger than that of the ball.

4. The circulating type ball spline bearing as claimed in one of the foregoing claims 1 to 3, wherein each of the ball turn channels provided in the end lids of the cylindrical outer sleeve is formed by fitting a spacer onto an arcuately bent ball turn groove.

5. The circulating type ball spline bearing as claimed in claim 4, wherein a plurality of ball-turn channels are formed at predetermined locations in the end lids such that each of the ball turn channels is arcuately bent as seen not only on the plane extending parallel to the axis of the outer sleeve but also on the plane extending perpendicular to said plane.

* * * * *